(12) United States Patent
Beckley et al.

(10) Patent No.: US 7,473,734 B2
(45) Date of Patent: Jan. 6, 2009

(54) MICHAEL ADDITION COMPOSITIONS

(75) Inventors: Ronald Scott Beckley, Gilbertsville, PA (US); Thomas Frederick Kauffman, Harleysville, PA (US); Michael John Zajaczkowski, York, PA (US)

(73) Assignee: Rohm and Haas Company, Philadelphia, PA (US)

( * ) Notice: Subject to any disclaimer, the term of this patent is extended or adjusted under 35 U.S.C. 154(b) by 472 days.

(21) Appl. No.: 11/120,231

(22) Filed: May 2, 2005

(65) Prior Publication Data

US 2006/0247374 A1    Nov. 2, 2006

(51) Int. Cl.
*C08G 63/91* (2006.01)
*C08G 69/48* (2006.01)
(52) U.S. Cl. ............... 525/54.2; 525/419; 528/302; 528/492
(58) Field of Classification Search ........... 528/302, 528/492; 525/54.2, 419
See application file for complete search history.

(56) References Cited

U.S. PATENT DOCUMENTS 5,017,649 A    5/1991    Clemens
5,959,028 A    9/1999    Irie
6,855,796 B2    2/2005    Lachowicz et al.
2003/0165701 A1    9/2003    Straw
2006/0094804 A1    5/2006    Lachowicz

FOREIGN PATENT DOCUMENTS

| EP | 0808860 | 11/1997 |
| EP | 1435383 | 7/2004 |
| JP | 1996239436 A | 9/1996 |
| JP | 1996259672 A | 10/1996 |

OTHER PUBLICATIONS

Clemens, et al., "A Comparison of Catalysts for Crosslinking Acetoacetylated Resins via the Michael Reaction", J. Coatings Technology, Mar. 1989, vol. 61, No. 770, pp. 83-91.
Clemens, et al, *A Comparison of Catalysts for Crosslinking Acetoacetylated Resins via the Michael Reaction*, Journal of Coatings Technology vol. 61, No. 770, Mar. 1989 83-91.

*Primary Examiner*—Duc Truong
(74) *Attorney, Agent, or Firm*—Carl P. Hemenway

(57) ABSTRACT

A functional composition is provided that comprises at least one multi-functional Michael acceptor, at least one multi-functional Michael donor, and at least one weakly basic catalyst.

12 Claims, No Drawings

MICHAEL ADDITION COMPOSITIONS

BACKGROUND

One chemical reaction potentially useful as a curing reaction is Michael addition. For example, US Patent Application 20030083436 discloses a composition, useful as an adhesive, comprising a product of a reaction between an α,β-unsaturated multi-carboxylic acid ester and a particular polyester or polyamide compound with methylene groups adjacent to carbonyl groups, in the presence of a non-amine strong base catalyst such as an alkali alkoxide.

Use of strong base catalysts are well known for Michael addition reactions whereas the use of weak base catalysts for curing at 25° C. or lower is not known, as described by Clemens and Rector (Journal of Coatings Technology, Vol. 61, No. 770, 1989). U.S. Pat. No. 6,855,796 B2 discloses the use of tertiary phosphine weak bases to prepare oligomeric or low molecular weight polymeric, non-cross-linked curable resins which are further cured to high polymer by exposure to actinic radiation. These curable resins are prepared at elevated temperatures (50-90° C.). U.S. Pat. No. 6,855,796 B2, however, does not teach the use of the phosphine weak base catalysts to produce high polymer or cross-linked polymer and does not teach the use of weak bases to effect curing at ambient temperatures. Further, it does not teach the use of weak base catalysts to produce adhesives, including laminating adhesives, two-component or two-pack adhesives, sealants, foams, films or elastomers.

One drawback to previously known compositions is that some catalysts are undesirably toxic or corrosive. Another drawback to previously known compositions is that some catalysts are undesirably reactive with ubiquitous materials (like, for example, air and/or water) and/or with ingredients of the composition before cure and/or with products of the process of curing the composition. One example is the use of soluble strong base catalysts (pKa>11) that may lead to hydrolysis or otherwise degrade reactants or products. Another example is the use of amine bases that can cause discoloration or yellowing. It is desired to provide compositions that are curable with the Michael addition reaction; that cure at room temperature; that are two-pack compositions; and that eliminate the use of catalysts that are undesirably toxic, corrosive and/or undesirably reactive.

Accordingly, the invention provides a functional composition comprising:
  (i) a first pack comprising at least one multi-functional Michael acceptor;
  (ii) a second pack comprising at least one multi-functional Michael donor;
  (iii) optionally, one or more non-functional ingredients;

wherein at least one of said first pack and said second pack further comprises at least one weakly basic catalyst; wherein said first pack and said second pack are each storage-stable; and wherein a functional mixture formed by admixing ingredients comprising said first pack, said second pack, and is capable of curing at 23° C. in 7 days or less.

The present invention also provides a functional composition comprising:
  (i) a first pack comprising at least one multi-functional Michael acceptor;
  (ii) a second pack comprising at least one multi-functional Michael donor;
  (iii) optionally, one or more non-functional ingredients;

wherein at least one of said first pack and said second pack further comprises at least one weakly basic non-amine, non-phosphine catalyst; wherein said first pack and said second pack are each storage-stable; and wherein a functional mixture formed by admixing ingredients comprising said first pack, said second pack, and is capable of curing at 23° C. in 7 days or less.

The present invention also provides a functional composition comprising:
  (i) a first pack comprising at least one multi-functional Michael acceptor;
  (ii) a second pack comprising at least one multi-functional Michael donor;
  (iii) optionally, one or more non-functional ingredients;

wherein at least one of said first pack and said second pack further comprises at least one weakly basic catalyst; wherein said catalyst is selected from the group consisting of sodium salts of carboxylic acids, magnesium salts of carboxylic acids, aluminum salts of carboxylic acids, chromium salts of alkyl carboxylic acids that have 6 or fewer carbon atoms, chromium salts of aromatic carboxylic acids, potassium salts of alkyl mono-carboxylic acids that have 6 or fewer carbon atoms, potassium salts of multi-carboxylic acids, alkali metal carbonates, alkali metal bicarbonates, alkali metal phosphates, alkali metal hydrogen phosphates, alkali metal phosphate esters, and alkali metal pyrophosphates and mixtures thereof; wherein said first pack and said second pack are each storage-stable; wherein a functional mixture formed by admixing ingredients comprising said first pack, said second pack, and said optional non-functional ingredients is capable of curing at 23° C. in 7 days or less.

DETAILED DESCRIPTION OF THE INVENTION

As used herein, "(meth)acrylate" means acrylate or methacrylate; "(meth)acrylic" means acrylic or methacrylic; and "(meth)acrylamide" means acrylamide or methacrylamide.

The present invention involves the use of compounds with functional groups capable of undergoing a Michael addition reaction. As used herein the Michael addition reaction refers to carbon Michael addition (to distinguish it from amine Michael reaction) where the donor is not an amine but rather an activated methylene compound. Michael addition is taught, for example, by R T Morrison and R N Boyd in *Organic Chemistry*, third edition, Allyn and Bacon, 1973. The reaction is believed to take place between a Michael donor and a Michael acceptor, in the presence of a catalyst where the donor is not an amine but rather an activated methylene compound.

A "Michael donor," as used herein, is a compound with at least one Michael donor functional group, which is a functional group containing at least one Michael active hydrogen atom, which is a hydrogen atom attached to a carbon atom that is located between two electron-withdrawing groups such as $C=O$ and/or $C\equiv N$. Examples of Michael donor functional groups are malonate esters, acetoacetate esters, malonamides, and acetoacetamides (in which the Michael active hydrogens are attached to the carbon atom between two carbonyl groups); and cyanoacetate esters and cyanoacetamides (in which the Michael active hydrogens are attached to the carbon atom between a carbonyl group and a cyano group). A compound with two or more Michael active hydrogen atoms is known herein as a multi-functional Michael donor. A Michael donor may have one, two, three, or more separate functional groups that each contain one or more Michael active hydrogen atoms. The total number of Michael active hydrogen atoms on the molecule is the functionality of the Michael donor. As used herein, the "skeleton" of the Michael donor is the portion of the donor molecule other than the functional group containing the Michael active hydrogen atom(s).

A "Michael acceptor," as used herein, is a compound with at least one functional group with the structure (I)

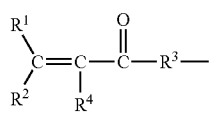

where $R^1$, $R^2$, and $R^4$ are, independently, hydrogen or organic radicals such as for example, alkyl (linear, branched, or cyclic), aryl, aryl-substituted alkyl (also called aralkyl or arylkyl), and alkyl-substituted aryl (also called alkaryl or alkylaryl), including derivatives and substituted versions thereof. $R^1$, $R^2$, and $R^4$ may or may not, independently, contain ether linkages, carboxyl groups, further carbonyl groups, thio analogs thereof, nitrogen-containing groups, or combinations thereof. $R^3$ is oxygen, a nitrogen-containing group, or any of the organic radicals described above for $R^1$, $R^2$, and $R^4$. A compound with two or more functional groups, each containing structure (I), is known herein as a multi-functional Michael acceptor. The number of functional groups containing structure (I) on the molecule is the functionality of the Michael acceptor. As used herein, the "skeleton" of the Michael acceptor is the portion of the donor molecule other than structure (I). Any structure (I) may be attached to another (I) group or to the skeleton directly.

According to one embodiment, donors and acceptors with skeletons with Mn less than 1000 are used. Such donors and acceptors are either monomeric or oligomeric. Examples of such skeletons are neopentyl glycol, trimethylolpropane, glycerol, tripropylene glycol, polyethylene glycols of 200 to 600 Mn, pentaerytritol, ethylene glycol, propylene glycol, hexanediol, tricyclodecanedimethylol, 2,2,4-trimethyl-1,3-pentandiol, 1,3 propanediol, bis-phenol A di glycidyl epoxy, 1,4 butanediol, cyclohexanedimethanol, alkoxylated and propoxylated versions of neopentyl glycol, hexanediol, cyclo-hexanedimethanol, bisphenol A di glycidyl epoxy, tri-ethylene glycol, tetra-ethylene glycol. Functional mixtures in which both donor and acceptor are based on skeletons of Mn less than 1000 are especially useful for adhesives and related applications. Such mixtures have low initial viscosity without the use of solvent which can be applied by a variety of processes at temperatures below 50° C. and more preferably below 45° C. and most preferably below 40° C. Such mixtures have an unusual combination of ease of processing, good pot-life, and fast cure rate.

The practice of the present invention involves the use of at least one soluble weakly basic catalyst. A "catalyst," as used herein, is a compound that will catalyze a Michael addition reaction. While the invention is not limited to any specific theory, it is believed that the catalyst abstracts a hydrogen ion from the Michael donor.

In some embodiments, one or more optional adjuvants may be used. Adjuvants are materials that are not Michael donors, Michael acceptors, or catalysts; adjuvants are also called herein "non-functional ingredients." Adjuvants are chosen to improve the properties; adjuvants include, for example, such materials as solvents, tackifiers, emulsifiers, polymers, plasticizers, blowing agents, surfactants, wetting agents, expandable microspheres, pigments, dyes, and thickeners. Adjuvants are preferably chosen and used in a way that does not interfere with the practice of the invention (for example, adjuvants will preferably be chosen that do not interfere with the admixing of the ingredients, the cure of functional mixture, the application to substrate, or the final properties of the cured functional mixture).

In the practice of the present invention, the skeleton of the multi-functional Michael acceptor may be the same or different from the skeleton of the multi-functional Michael donor. In some embodiments, one or more polyhydric alcohols are used as at least one skeleton. Some polyhydric alcohols suitable as skeletons for either the multi-functional Michael acceptor or the multi-functional Michael donor include, for example, alkane diols, alkylene glycols, alkane diol dimers, alkane diol trimers, glycerols, pentaerythritols, polyhydric polyalkylene oxides, other polyhydric polymers, and mixtures thereof. Some polyhydric alcohols suitable as skeletons include, for example, cyclohexane dimethanol, hexane diol, trimethylol propane, glycerol, ethylene glycol, propylene glycol, pentaerythritol, neopentyl glycol, diethylene glycol, dipropylene glycol, butanediol, 2-methyl-1,3-propanediol, trimethylolethane, similar polyhydric alcohols, substituted versions thereof, and mixtures thereof.

Further examples of polyhydric alcohols suitable as skeletons in the present invention include, for example, polyhydric alcohols with molecular weight of 150 or greater (in addition to those named herein above). Also, mixtures of suitable polyhydric alcohols are suitable.

In some embodiments, the skeleton of the multi-functional Michael donor or the multi-functional Michael acceptor or both is an oligomer or a polymer. A polymer, as used herein and as defined by F W Billmeyer, JR. in *Textbook of Polymer Science*, second edition, 1971 ("Billmeyer") is a relatively large molecule made up of the reaction products of smaller chemical repeat units. Normally, polymers have 11 or more repeat units. Polymers may have structures that are linear, branched, star shaped, looped, hyperbranched, or crosslinked; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof.

Polymers have relatively high molecular weights. Polymer molecular weights can be measured by standard methods such as, for example, size exclusion chromatography or intrinsic viscosity. Generally, polymers have number-average molecular weight (Mn) of 1,000 or more. Polymers may have extremely high Mn; some polymers have Mn above 1,000,000; typical polymers have Mn of 1,000,000 or less.

"Oligomers," as used herein, are structures similar to polymers except that oligomers have fewer repeat units and lower molecular weight. Normally, oligomers have 2 to 10 repeat units. Generally, oligomers have Mn of 400 to 1,000.

The functional composition of the present invention is a two-pack composition. The term "two-pack" is used herein to mean that all the ingredients necessary for Michael addition to occur are contained in the admixture obtained by admixing the first pack and the second pack. It is contemplated that some embodiments of the present invention will involve using the functional mixture obtained by admixing the first pack and the second pack without adding any adjuvants to the admixture obtained by admixing the first pack and the second pack. Also contemplated are embodiments in which the first pack, the second pack, and one or more adjuvants are admixed to form the functional mixture of the present invention.

In the practice of the present invention, the first pack contains at least one multi-functional Michael acceptor. In some embodiments, the first pack contains further optional ingredients, including, for example, one or more Michael donors, one or more optional adjuvants, and mixtures thereof. In some embodiments, the first pack contains no multi-functional Michael donor. In some embodiments (herein called "2PA" embodiments), the first pack contains no Michael donor. The second pack contains at least one multi-functional Michael donor. In some embodiments, the second pack contains further optional ingredients, including, for example, one or more Michael acceptors, one or more optional adjuvants, and mixtures thereof. In some embodiments, the second pack contains no multi-functional Michael acceptor. In some embodiments, the second pack contains no Michael acceptor.

Components of the functional mixture can be distributed any number of ways in the two pack composition of the present invention. According to one embodiment of the two-pack composition, the first pack contains at least one multi-functional Michael acceptor, and the second pack contains at least one multi-functional Michael donor. In the practice of two-pack embodiments of the present invention, one or both of the first pack and the second pack contains at least one weakly basic catalyst. In some two-pack embodiments, the first pack, or the second pack, or both packs, contains further optional adjuvants. In some two-pack embodiments, the ingredients for each pack are chosen so that no one pack will contain all three of a Michael acceptor, a Michael donor, and a catalyst.

In the practice of the present invention, one or both of the first pack and the second pack contains at least one weakly basic catalyst. In some embodiments, the ingredients for each pack are chosen so that no one pack will contain all three of a Michael acceptor, a Michael donor, and a catalyst.

In some 2PA embodiments, the second pack will contain, in addition to the at least one multi-functional Michael donor, at least one weakly basic catalyst and no Michael acceptor. In other 2PA embodiments, the second pack will contain, in addition to the at least one multi-functional Michael donor, at least one Michael acceptor and no catalyst. Also contemplated are 2PA embodiments in which the second pack contains no Michael acceptor and no catalyst.

For another example, in some embodiments (herein called "2PNA" embodiments), the first pack contains no catalyst, and the second pack contains, in addition to at least one multi-functional Michael donor, at least one weakly basic catalyst. In 2PNA embodiments, the second pack contains no Michael acceptor.

Also contemplated are embodiments in which the first pack and the second pack each contain one or more weakly basic catalysts.

Also contemplated are embodiments that involve the use of at least one compound that is both a Michael acceptor and a Michael donor; such a compound has both at least one Michael donor functional group and at least one functional group with structure (I). It is contemplated that such a compound would not be used in the same pack as a compound that is effective as a catalyst for Michael addition.

It is contemplated that the first pack and the second pack will be stored in separate containers until shortly before it is intended to use the functional mixture that will result from admixing them. The admixture of the two packs plus any optional adjuvants (if any adjuvants are used) is known herein as a functional mixture.

In some embodiments of the present invention, the ingredients of the first pack or the ingredients of the second pack or the ingredients of each pack are dissolved in a solvent or otherwise carried in a fluid medium (for example, as an emulsion or dispersion). If a solvent or other fluid medium is used in both packs, the solvents or other fluid media of the two packs may be chosen independently of each other. In some embodiments, the first pack or the second pack or both packs are substantially free of solvent. As defined herein, a material is "substantially free of solvent" if that material contains at least 75% solids by weight based on the total weight of that material. By "solids" is meant herein the weight all Michael donors, all Michael acceptors, all polymers, all materials that are solid when pure at 25° C., and all materials with boiling point above 200° C. In some embodiments, the functional mixture is substantially free of solvent. In some embodiments, the functional mixture is at least 80% solids, or at least 90% solids, or at least 95% solids, or at least 98% solids, by weight based on the weight of the functional mixture.

Also contemplated are "low solids" embodiments, which are embodiments in which the functional mixture contains less than 75% solids, by weight based on the weight of the functional mixture. In some low solids embodiments, the solids may be dissolved in a fluid medium or dispersed in a fluid medium or a combination thereof. In low solids embodiments, the non-solid ingredients may include one or more non-aqueous compounds, or water, or a combination thereof. In some low solids embodiments, the functional mixture contains 25% solids or higher, by weight based on the weight of the functional mixture. In some low solids embodiments, one or more Multi-functional Michael donor, one or more multi-functional Michael acceptor, or one or more of each, is a polymer.

In some embodiments of the present invention, the functional mixture contains no externally added photoinitiator. "Photoinitiator" herein means a compound that effectively initiates polymerization upon exposure to visible, ultraviolet (UV), or other radiation. "Externally added" herein means a compound that is not a Michael donor, a Michael acceptor, a catalyst (as defined herein above for the practice of the present invention), or a product of the cure process in a composition of the present invention. Independently, in some embodiments of the present invention, the functional mixture contains no compounds with epoxide groups. Independently, in some embodiments of the present invention, the functional mixture contains no compounds with isocyanate groups. Independently, in some embodiments of the present invention, the functional mixture contains no compounds with reactive groups capable of chemical reactions effective for curing other than compounds with reactive groups that participate in the Michael addition reaction.

In some embodiments of the present invention, the functional mixture comprising no externally added photoinitiator can be partially reacted by exposure to electron beam (EB) radiation and then subsequently cured by the Michael addition reaction. This dual cure mechanism would allow for fast "green strength" development followed by full cure to a cross-linked polymer network.

In other embodiments of the present invention, the functional mixture contains externally added photoinitiator. In some embodiments, the externally added photoinitiators is a free radical initiator such as Irgacure™ 184 which initiates free radical polymerization of a portion of the multifunctional acrylates (acceptors) while allowing for further reaction via the Michael addition reaction (a dual reaction system). Alternatively, in some embodiments, the externally added photoinitiator is a weakly basic photolatent amine catalyst having a corresponding conjugate acid with a pKa less than 11 prior to exposure to UV radiation. Upon irradiation the basicity of the photoinitiator increases dramatically thereby catalyzing or further catalyzing the Michael addition reaction. In some embodiments the photolatent amine does not exhibit weak base catalytic behavior before actinic radiation but does so after irradiation (functions as only a photoinitiator). In some embodiments, the photolatent amine catalyst may exhibit catalytic behavior before actinic radiation (functions as an initial weak base catalyst and a base catalyst photoinitiator upon irradiation). One example of the latter type of photolatent amine is CGI™-90 from Ciba which provides two catalyts useful in the Michael addition reaction.

In choosing a specific multi-functional Michael donor and a specific multi-functional Michael acceptor to use in the practice of the present invention, it is desirable to consider the functionalities. It is generally believed that reacting a Michael donor with functionality of 2 with a Michael acceptor with a functionality of 2 will lead to linear molecular structures. Often, it is desirable to create molecular structures that are branched and/or cross-linked, which is believed to require the use of at least one ingredient with functionality of 3 or greater. Therefore, it is contemplated that some embodiments will have at least one Michael donor with functionality of 3 or greater, or will have at least one Michael acceptor with functionality of 3 or greater, or will have both at least one Michael donor with functionality of 3 or greater and at least one Michael acceptor with functionality of 3 or greater. In some embodiments, the average functionality of all the Michael donors and all the Michael acceptors in the functional mixture taken together is greater than 2; in some embodiments, that average functionality is 2.5 or greater; or 3 or greater; or 4 or greater.

In the functional mixtures of the present invention, the relative proportion of multi-functional Michael acceptors to multi-functional Michael donors can be characterized by the reactive equivalent ratio, which is the ratio of the number of all the functional groups (I) in the functional mixture to the number of Michael active hydrogen atoms in the functional mixture. In some embodiments, the reactive equivalent ratio is 0.1:1 or higher; or 0.2:1 or higher; or 0.3:1 or higher; or 0.4:1 or higher; or 0.45:1 or higher. In some embodiments, the reactive equivalent ratio is 3:1 or lower; or 2:1 or lower; or 1.2:1 or lower; or 0.75:1 or lower; or 0.6:1 or lower.

In some embodiments, it is contemplated that the cured functional mixture will have few or no unreacted functional groups (I).

In other embodiments, usually those with relatively high reactive equivalent ratio, the cured functional mixture is believed to be likely to contain unreacted functional groups (I); if the reactive equivalent ratio is high enough, it is believed to be likely that the cured functional mixture will contain entire multifunctional Michael acceptor molecules (herein called "unreacted multifunctional Michael acceptor molecules") in which none of the functional groups (I) on that molecule have reacted. For example, if the multifunctional Michael acceptor molecules all have two functional groups (I) each, then a functional mixture with reactive equivalent ratio of 2:1 or higher is believed to be likely to yield a cured functional mixture in which there are some unreacted multi-functional Michael acceptor molecules. Also, some embodiments are contemplated in which the cured functional mixture has few or no unreacted multifunctional Michael acceptor molecules but does have a useful amount of unreacted functional groups (I). In some embodiments, the presence of unreacted functional groups (I) in the cured functional mixture, either with or without unreacted multifunctional Michael acceptor molecules, will be desirable (for example, if it is intended to conduct chemical reactions in addition to Michael addition). In other embodiments, it will be desirable for the cured functional mixture to have few or no unreacted multifunctional Michael acceptor molecules, or it will be desirable for the cured functional mixture to have few or no unreacted functional groups (I); in such embodiments, it is contemplated that the practitioner will readily be able to choose a reactive equivalent ratio that will be low enough to make it likely that the cured functional mixture will have few or no unreacted multifunctional Michael acceptor molecules or to have few or no unreacted functional groups (I), as desired.

In some embodiments of the present invention, multi-functional Michael donors, multi-functional Michael acceptors, weakly basic catalysts, and any other ingredients are chosen so that the functional mixture thereof is homogeneous (i.e., the mixture will not phase separate upon standing or curing). In other embodiments of the present invention, multi-functional Michael donors, multi-functional Michael acceptors, weakly basic catalysts, and any other ingredients are chosen so that the functional mixture thereof forms an emulsion. Also envisioned are embodiments in which the functional mixture contains one or more ingredients dispersed as a suspension in liquid; it is useful in some of such embodiments that the suspension be stable (i.e., that the solids do not settle or coagulate upon standing or curing).

The practice of the present invention involves the use of at least one multi-functional Michael acceptor. In some embodiments, the skeleton of the multi-functional Michael acceptor is the residue of a polyhydric alcohol, such as, for example, those listed herein above. In some embodiments, the skeleton of the multi-functional Michael acceptor may be a polymer. In some embodiments, the skeleton of the multi-functional Michael acceptor may be an oligomer.

Some suitable multi-functional Michael acceptors in the present invention include, for example, molecules in which some or all of the structures (I) are residues of (meth)acrylic acid, (meth)acrylamide, fumaric acid, or maleic acid, substituted versions thereof, or combinations thereof, attached to the multi-functional Michael acceptor molecule through an ester linkage or an amide linkage. A compound with structures (I) that include two or more residues of (meth)acrylic acid attached to the compound with an ester linkage is called herein a "multi-functional (meth)acrylate." Multi-functional (meth)acrylates with at least two double bonds capable of acting as the acceptor in Michael addition are suitable multi-functional Michael acceptors in the present invention. Some suitable multi-functional (meth)acrylates are, for example, multi-functional acrylates (compounds with two or more residues of acrylic acid, each attached via an ester linkage to the skeleton; also called MFAs).

It is to be understood herein that an acceptor that is described as "an acrylate of" (or as "diacrylate of" or as "triacrylate of", etc.) a compound or that is described as an "acrylated" compound has a structure that could be formed by reacting that compound with acrylic acid. In many cases, the acceptor so described is actually made by performing such a reaction, though the acceptor so described could in fact be made by other methods. It is contemplated that some suitable acceptors will be described as "acrylated" or as "acrylate of" (or "diacrylate of" or "triacrylate of", etc.) compounds with hydroxyl groups, amine groups, epoxide groups, other groups that are thought to react with carboxyl groups, or combinations thereof. For example, the acceptor

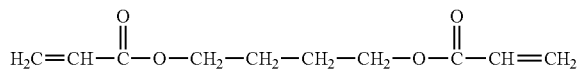

is described as acrylated butane diol and is also described as the diacrylate of butane diol; it is contemplated this acceptor could be made by reacting butane diol with acrylic acid, though the same structure could be made by any method. For another example, if a known diglycidyl ether compound had the structure (II):

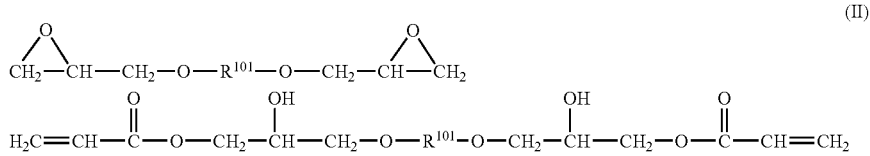

(II)

then the MFA described as the "diacrylate of (II)" would have the following structure:

Examples of suitable multi-functional Michael acceptors that are MFAs include, for example, diacrylates of one or more of the following: alkyl diols, glycols, ether-containing diols (such as, for example, dimers of glycols, trimers of glycols, and polyalkylene diols), alkoxylated alkyl diols, polyester oligomer diols, bisphenol A, ethoxylated bisphenol A, and polymers with at least two hydroxyl groups. Also suitable are triacrylates of similar triols, including, for example, alkyl triols and alkoxylated alkyl triols. Additionally suitable are tetra-, penta-, and higher acrylates of similar polyhydric compounds.

Further examples of suitable MFAs include di-, tri-, tetra-, and higher acrylates of compounds that have two or more functional groups, other than hydroxyl groups, that are capable of forming ester linkages with acrylic acid. Such MFAs include, for example, diacrylates of compounds with two epoxide groups, such as, for example, epoxy resins, diglycidyl ether, bisphenol A diglycidyl ether, ethoxylated bisphenol A diglycidyl ether, and mixtures thereof.

Also among suitable multi-functional Michael acceptors are compounds with two or more functional groups each containing structure (I) in which one or more of the functional groups containing structure (I) is the residue of (meth)acrylamide. In other suitable multi-functional Michael acceptors, at least one functional group containing structure (I) is a residue of (meth)acrylamide, and at least one functional group containing structure (I) is a functional group other than a residue of (meth)acrylamide.

Mixtures of suitable multi-functional Michael acceptors are also suitable. In some embodiments, the multi-functional Michael acceptor includes at least one diacrylate of a compound with two epoxide groups and at least one diacrylate of a polyalkylene oxide diol.

The practice of the present invention involves the use of at least one multi-functional Michael donor. In some embodiments of the present invention, the skeleton of the multi-functional Michael donor is the residue of a polyhydric alcohol, such as, for example, those listed herein above. In some embodiments, the skeleton of the multi-functional Michael donor may be a polymer, such as for example, a polyalkylene oxide, a polyurethane, a polyethylene vinyl acetate, a polyvinyl alcohol, a polydiene, a hydrogenated polydiene, an alkyd, an alkyd polyester, a polyolefin, a halogenated polyolefin, a polyester, a halogenated polyester, a (meth)acrylate polymer, a copolymer thereof, or a mixture thereof. In embodiments in which the skeleton of a multi-functional Michael donor is a polymer, the Michael donor functional group may be pendant from the polymer chain, or it may be incorporated into the polymer chain, or a combination thereof.

In suitable multi-functional Michael donors, the functional groups with Michael active hydrogens may be attached to the skeletons in any of a wide variety of arrangements. In some embodiments, the multi-functional Michael donor has the structure

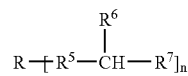

where n is 2 or more;

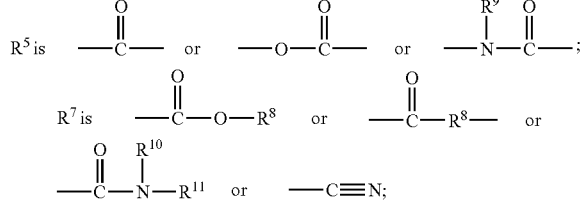

$R^6$, $R^8$, $R^9$, $R^{10}$, and $R^{11}$ are, independently, H, alkyl (linear, cyclic, or branched), aryl, arylkyl, alkaryl, or substituted versions thereof; and R is a residue of any of the polyhydric alcohols or polymers discussed herein above as suitable as the skeleton of a multi-functional Michael donor. In some embodiments, $R^6$ will be the residue of a Michael acceptor. In some embodiments, one or more of $R^6$, $R^8$, $R^9$, $R^{10}$, and $R^{11}$ will be attached to further functional groups with Michael active hydrogens.

In some embodiments, n is 3 or more. In some embodiments, the second pack contains more than one multi-functional Michael donor. In such embodiments, the mixture of multi-functional Michael donors can be characterized by the number-average value of n. In some embodiments, the mixture of multi-functional Michael donors in the second pack has number average value of n of 4 or less, or 3 or less.

Some suitable multi-functional Michael donors include, for example, acetoacetoxy substituted alkyl(meth)acrylates; amides of malonic acid, amides of acetoacetic acid, alkyl esters of malonic acid, and alkyl esters of acetoacetic acid, where the alkyl groups may be linear, branched, cyclic, or a combination thereof.

Some suitable multi-functional Michael donors are, for example, alkyl compounds with two or more acetoacetate groups. Such multi-functional Michael donors include, for example, alkyl diol diacetoacetates (also known as alkyl diol bisacetoacetates) such as, for example, butane diol diacetoacetate, 1,6-hexanediol diacetoacetate, neopentylglycol diacetoacetate, 4,8-Bis(hydroxymethyl)tricyclo[5.2.1.0$^{2,6}$]decane, 2-methyl-1,3-propanediol diacetoacetate, ethylene glycol diacetoacetate, propylene glycol diacetoacetate; cyclohexanedimethanol diacetoacetate; other diol diacetoacetates; alkyl triol triacetoacetates (also known as alkyl triol trisacetoacetates), such as, for example, trimethylol propane triacetoacetate, pentaerythritol triacetoacetate, glycerol trisacetoacetate, or trimethylolethane triacetoacetate; and the like. Some further examples of suitable multi-functional Michael donors include tetra-, penta-, and higher acetoacetates of polyhydric alcohols (i.e., polyhydric alcohols on which four, five, or more hydroxyl groups are linked to acetoacetate groups through ester linkages), including, for example, pentaerythritol tetraacetoacetate, dipentaerythritol pentaacetoacetate, and dipentaerythritol hexaacetoacetate.

Some additional examples of suitable multi-functional Michael donors are ether glycol diacetoacetates (also known as ether glycol bisacetoacetates), such as, for example, diethylene glycol diacetoacetate, dipropylene glycol diacetoacetate, polyethylene glycol diacetoacetate, and polypropylene glycol diacetoacetate.

Some other suitable multi-functional Michael donors are those with a single Michael donor functional group per molecule, where that Michael donor functional group has two Michael active hydrogen atoms. Such multi-functional Michael donors include, for example, alkyl mono-acetoacetates (i.e., a compound whose structure is an alkyl group with a single attached acetoacetate group).

Additional examples of suitable multi-functional Michael donors include compounds with one or more of the following functional groups: acetoacetate, acetoacetamide, cyanoacetate, and cyanoacetamide; in which the functional groups may be attached to one or more of the following skeletons: polyester polymer, polyether polymer, (meth)acrylic polymer, polydiene polymer.

Some suitable multi-functional Michael donors include, for example, oligomers and polymers that are made from monomers that include acetoacetoxyethyl methacrylate (AAEM) and one or more of the following: (meth)acrylic acid, esters of (meth)acrylic acid, amides of (meth)acrylic acid, substituted versions thereof, and mixtures thereof. It is contemplated that, in some embodiments, at least one such oligomer or polymer will be used that is made from monomers that include 10% by weight or more of AAEM, based on the weight of all monomers used to make that oligomer or polymer.

Some suitable multi-functional Michael donors are multi-functional acetoacetate functional polyester polymers and acetoacetate functional polyesteramide polymers.

Mixtures of suitable multi-functional Michael donors are also suitable.

One category of multi-functional Michael donors are known as malonates. Malonates have

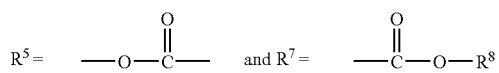

(where $R^5$, $R^7$, and $R^8$ are defined herein above). In some embodiments, malonates are not used; that is, in such embodiments, non-malonate multi-functional Michael donors are used.

The practice of the present invention involves the use of at least one weakly basic catalyst. A catalyst is "soluble" as defined herein if it meets the following solubility criterion. A suitable test mixture is selected; the test mixture may be a single multi-functional Michael acceptor, a mixture of two or more multi-functional Michael acceptors, a single multi-functional Michael donor, or a mixture of two or more multi-functional Michael donors. The test mixture is part or all of the pack in which the weakly basic catalyst will be used. For example, if a catalyst will be used in the first pack, the ratio of the weight of that catalyst to be used in the first pack to the sum of the weights of all multi-functional Michael acceptors in the first pack is herein called X1. The ratio of the sum of the weights of the ingredients of the test mixture to the sum of the weights of all the multi-functional Michael acceptors in the first pack is herein called X2. Then, to perform the solubility test, at least enough catalyst is added to the test mixture so that the ratio of the weight of catalyst to the weight of test mixture is Y or more, where Y=X1/X2. The mixture of catalyst and test mixture is subjected to the dissolution procedure defined herein below, and the amount of catalyst actually dissolved in the test mixture is determined thereby. If the ratio of the weight of actually-dissolved catalyst to the weight of test mixture is Y or greater, the catalyst is considered to be soluble.

One useful way of practicing the above solubility test is to choose the amount of test mixture and catalyst so that the ratio X2 equals 1.0.

For a catalyst that will be used in the second pack, the same solubility criterion is applied, using one or more multi-functional Michael donors as the test mixture.

The dissolution procedure used for determining solubility is defined herein as follows. The mixture of catalyst and test mixture is heated to 75° C. for 2 hours; if the resulting mixture is clear (i.e., it shows no haze or sediment visible to the unaided eye), then the catalyst is considered to be soluble. If the resulting mixture is clear after heating to temperature below 75° C., or if the resulting mixture is clear when mixed at any temperature below 75° C., or if the resulting mixture is clear at a time less than 2 hours after the catalyst was added to the test mixture, the catalyst is considered to be soluble. If, after 2 hours at 75° C., the resulting mixture is not clear, it is filtered through fritted glass; and the filtrate is titrated with dilute HCl to determine the amount of catalyst that is actually dissolved in the test mixture.

When a filtrate is titrated with dilute HCl, one acceptable procedure is as follows. An amount of filtrate estimated to contain between 0.1 and 0.2 mmol of catalyst is dissolved in 30 ml of denatured alcohol. This solution of filtrate is then titrated with aqueous 0.1022 molar HCl to a sharp endpoint. Titrating may be done by using any of a wide variety of methods and/or apparatus known in the art. For example, an RTS822 recording titration system manufactured by Radiometer Analytical SAS may be used. The progress and the endpoint of the titration may be measured by any of a wide variety of methods and/or apparatus known in the art, for example using electrodes such as, for example a glass electrode and a reference electrode, such as, for example, pHG201 and REF201 electrodes from Radiometer Analytical SAS. After the endpoint is detected, the following amounts are calculated by standard methods: the moles of catalyst present in solution of filtrate, and the amount of catalyst actually dissolved in the test mixture.

In general, in the practice of the present invention, a catalyst is soluble if enough catalyst dissolves in the test mixture to provide sufficient catalyst in the functional composition so that, when the functional admixture is formed, cure will take place in 7 days or less at 23° C. In some embodiments, catalyst dissolves in the test mixture in the amount of 0.1 gram or more of catalyst per 100 grams of test mixture; or 0.2 grams or more of catalyst per 100 grams of test mixture; or 0.5 grams or more of catalyst per 100 grams of test mixture; or 1 gram or more of catalyst per 100 grams of test mixture. If the mixture of catalyst and test mixture is mixed at temperature lower than 75° C., or for less time than two hours, or both, and a sufficient amount of catalyst is actually dissolved in the test mixture, then the catalyst is considered to be soluble.

According to one embodiment of the present invention, the weakly basic catalyst is an insoluble weakly basic catalyst that is dissolved in one or more solvents which is then introduced to the reactants to form an emulsion.

According to one embodiment of the present invention, the weakly basic catalyst is an insoluble weakly basic catalyst that is dispersed into the reactants.

In some embodiments of the present invention, at least one soluble weakly basic catalyst is used in the form of pure material. By "pure material" is meant herein material that has a level of purity that is readily obtainable from commercial manufacturers or has a higher level of purity.

In other embodiments of the present invention, the first pack or the second pack or each pack is formed by adding a solution of soluble weakly basic catalyst to the other ingredients of that pack. By "solution of soluble weakly basic catalyst" is meant herein a homogeneous mixture of a solvent (which is a non-functional ingredient, as defined herein above) and a soluble (as defined herein above) weakly basic catalyst. The solvent in such embodiments may be water or an organic solvent, such as, for example, hydrocarbons, alcohols, and ketones. Water is known to be suitable. For example, in some embodiments, to form the first pack, a solution of a soluble weakly basic catalyst is added to one or more multi-functional Michael acceptors. Some suitable solutions of soluble weakly basic catalyst have concentration of soluble weakly basic catalyst of 50% or higher, or 65% or higher, by weight based on the weight of the solution. In some embodiments involving addition of a solution of soluble weakly basic catalyst, the pack containing the soluble weakly basic catalyst is subjected to elevated temperature or reduced pressure or both to remove some or all of the solvent. In other embodiments involving addition of a solution of soluble weakly basic catalyst, the solvent is left in place as part of the pack; that is, no steps are taken to remove the solvent from the pack.

In the practice of some embodiments of the present invention in which a solution of soluble weakly basic catalyst is added to a pack (i.e., is added to the first pack or to the second pack or to both packs) the pack to which the solution of soluble weakly basic catalyst is added will appear homogeneous.

In some embodiments of the present invention in which a solution of soluble weakly basic catalyst is added to a pack or to the functional mixture, the resulting admixture will appear cloudy. In such embodiments, it is contemplated, without limiting the invention to any model or theory, that the cloudiness occurs because the solvent used in the solution of soluble weakly basic catalyst is incompatible or insoluble with other ingredients; that the solvent remains as a separate phase; and that the solvent exists as droplets dispersed throughout the volume of the pack. It is further contemplated that, when such a dispersion of solvent droplets occurs, the soluble weakly basic catalyst may remain in the solvent droplets, or the soluble weakly basic catalyst may migrate out of the solvent and become dissolved in the other ingredients, or the soluble weakly basic catalyst may partition in some proportion between the solvent droplets and the other ingredients. In these embodiments, regardless of the location of the soluble weakly basic catalyst, as long as the soluble weakly basic catalyst is capable of meeting the solubility criterion defined herein above, packs or functional mixtures that include such dispersions of solvent droplets are considered suitable in the practice of the present invention.

As an example, in some embodiments, a weakly basic catalyst is dissolved in water to form an aqueous solution, and that aqueous solution is then mixed with one or more multi-functional Michael acceptors.

In some other embodiments of the present invention in which a weakly basic catalyst is added to at least one reactant of a pack or to the functional mixture, the resulting admixture forms an emulsion. As an example, in some embodiments, a weakly basic catalyst is mixed with one or more multi-functional Michael acceptors forming an emulsion. The emulsion can be added to another pack including at least one multi-functional Michael donor or the emulsion can be further admixed with the one multi-functional Michael donor to form a single pack.

In some other embodiments of the present invention, the weakly basic catalyst of the present invention is selected from the following: sodium salts of carboxylic acids, magnesium salts of carboxylic acids, aluminum salts of carboxylic acids, chromium salts of alkyl carboxylic acids 1 to 22 carbon atoms, including 6 or fewer carbon atoms, chromium salts of aromatic carboxylic acids, potassium salts of alkyl mono-carboxylic acids having 1 to 22 carbon atoms, including 6 or fewer carbon atoms, potassium salts of multi-carboxylic acids, and mixtures thereof. By "mono-carboxylic acid" is meant herein a carboxylic acid with one carboxyl group per molecule. By "multi-carboxylic acid" is meant herein a carboxylic acid with more than one carboxyl group per molecule. Among sodium, magnesium, and aluminum salts of carboxylic acids are, for example, sodium, magnesium, and aluminum salts of the following types of carboxylic acids: aromatic carboxylic acids, alkyl carboxylic acids with 7 to 22 carbon atoms, alkyl carboxylic acids with 6 or fewer carboxylic acids, and mixtures thereof.

In some embodiments, the weakly basic catalyst of the present invention is selected from the following: sodium salts of alkyl mono-carboxylic acids with 7 to 22 carbon atoms, sodium salts of alkyl mono-carboxylic acids with 6 or fewer carbon atoms, potassium salts of alkyl mono-carboxylic acids with 6 or fewer carbon atoms, and mixtures thereof.

A catalyst is "weakly basic," as defined herein, if it is a basic compound with the characteristic that the pKa of its conjugate acid is greater than or equal to 3 and also is less than or equal to 11. In some embodiments, the pKa of the conjugate acid of the soluble weakly basic catalyst is 3.5 or greater; or 4 or greater. In some embodiments, the pKa of the conjugate acid of the soluble weakly basic catalyst is 7.5 or less; or 5.5 or less; or 4.9 or less. The pKa of the conjugate acid of a base is a well known characteristic, and values of pKa's for the conjugate acids of many bases have been published, for example in the *Handbook of Chemistry and Physics*. 82nd edition, CRC press, 2001. While pKa's are sometimes measured in dilute aqueous solution, the pKa itself is a characteristic of a compound, whether or not the compound is actually used in an aqueous solution.

If the conjugate acid of the catalyst is a multi-carboxylcarboxylic acid, the soluble catalyst is considered weakly basic if the first pKa (i.e., the pKa representing the dissociation constant of the first hydrogen ion) is greater than or equal to 3 and is less than or equal to 11. Subsequent dissociation constants may have any value. This applies also to alkali metal carbonates, alkali metal phosphates, alkali metal hydrogen phosphates, alkali metal phosphate esters, and alkali metal pyrophosphates.

Some other suitable weakly basic catalysts are, for example, potassium acetate, sodium octoate, potassium caprylate and chromium acetate. Mixtures of suitable soluble weakly basic catalysts are also suitable.

One suitable soluble weakly basic catalyst is, for example, potassium acetate.

In some embodiments, at least one soluble weakly basic catalyst is a salt of a multivalent cation (such as, for example, chromium cation, magnesium cation, and aluminum cation) with a carboxylic acid. One suitable multivalent cation is, for example, chromium cation. One suitable soluble weakly basic catalyst is, for example, chromium acetate.

Mixtures of suitable soluble weakly basic catalysts are also suitable.

In some cases, multifunctional Michael acceptor compounds, as supplied by a manufacturer, contain some amount (usually a relatively small amount) of a salt of a carboxylic acid. It is contemplated that the present invention can be practiced with multifunctional Michael acceptors that do contain such salts, with multifunctional Michael acceptors that do not contain such salts, or with a mixture thereof.

In some embodiments, a suitable multifunctional Michael acceptor, as supplied by a manufacturer, contains at least one salt that is suitable as a soluble weakly basic catalyst. Such multifunctional Michael acceptors are contemplated to be used in the practice of the present invention. In some cases, the amount of salt that is present in the multifunctional Michael acceptor, as supplied by the manufacturer, is low enough that it would be desirable, in the practice of the present invention, to use an additional amount of weakly basic catalyst, which may be the same or different from the one already present in the multifunctional Michael acceptor. For example, in some embodiments, the first pack contains at least one of such a multifunctional Michael acceptor, optionally one or more other Michael acceptors, and an additional amount of weakly basic catalyst.

In some embodiments, the practice of the present invention involves the use of one or more weak base catalysts.

In some embodiments, the functional mixture of the present invention contains no catalyst that is not a weakly basic catalyst.

In some embodiments of the present invention, the first pack does not include prior to mixing with the second pack or onset of the curing process any anions (herein called "donor-derived anions") that can be created by removing a Michael active hydrogen atom from a Michael donor compound. An example of a donor-derived anion is the anion that can be created by removing a Michael active hydrogen atom from an acetoacetate group. Similar donor-derived anions can be created by removing a Michael active hydrogen atom from any one of the Michael donor functional groups described herein above. Independently, it is contemplated that, in some embodiments of the present invention, no effective amount of donor-derived anion is present in the second pack. Without limiting the invention to any particular theory, it is contemplated that, in some embodiments, after the first pack and the second pack are mixed, some compound that contains one or more donor-derived anions may be formed as an intermediate during the Michael addition reaction.

The practice of the present invention involves the use of a functional mixture. It is contemplated that the ingredients of the functional mixture will be chosen so that Michael addition will take place under the conditions of practicing the invention. For example, a particular multi-functional Michael acceptor may undergo the Michael addition reaction with some multi-functional Michael donors less readily than with other multi-functional Michael donors. For example, methacrylate groups usually react more readily with cyanoacetate groups than with acetoacetate groups. Further, some weakly basic catalysts promote the Michael addition reaction more strongly than others. However, even if the reaction between a specific multi-functional Michael donor and a specific multi-functional Michael acceptor is slow or ineffective, in some cases it will be possible to speed the reaction or make it effective by employing a more active weakly basic catalyst. The practitioner of the invention will readily be able to choose an effective combination of ingredients to achieve the desired speed of curing in the practice of the present invention.

In the practice of the present invention, the functional mixture is formed by admixing the first pack and the second pack; the admixing may be performed by any means. Optionally, the functional mixture includes one or more additional ingredients. In some embodiments, the ingredients are all liquids, and they may be admixed simply by placing the ingredients in a container and stirring. If any ingredient is a solid, it is contemplated that sufficient agitation will be provided to dissolve or suspend the solid in the functional mixture. In some embodiments, the first pack and the second pack may be admixed on a substrate, for example by applying alternate layers of first pack and second pack or by spraying separate streams of first pack and second pack onto the same area of the substrate.

The functional mixture of the present invention, when it is freshly mixed, should have a useful viscosity at 23° C. One useful means of measuring viscosity is with a Brookfield viscometer, with the spindle type and rotation speed chosen according to the instructions of the viscometer manufacturer as appropriate for the material to be measured. Generally, conditions for using Brookfield viscometer properly involve, for example, choosing spindle and rotation speed that give a reading on the instrument scale of 10% to 90% of full scale. For some embodiments, #4 spindle is appropriate. In some embodiments, the freshly-mixed functional mixture will be a liquid with viscosity of 0.01 Pa*s (10 cps) or higher. The freshly-mixed functional mixture will be a liquid with viscosity of 10,000 Pa*s (10,000,000 cps) or less. The desired viscosity will be determined by the means used to mix the ingredients and the means used to mold the functional mixture or apply it to a substrate. In some embodiments involving application of the functional mixture to substrate, viscosity of the functional mixture is 0.1 Pa*s (100 cps) or greater at 23° C.; or 0.2 Pa*s (200 cps) or greater at 23° C.; or 0.4 Pa*s (400 cps) or greater at 23° C. Independently, in some embodiments involving application of the functional mixture to substrate, viscosity is 2,000 Pa*s (2,000,000 cps) or less at 23° C.; or 1,000 Pa*s (1,000,000 cps) or less at 23° C.; or 500 Pa*s (500,000 cps) or less at 23° C. In embodiments involving use of the cured functional mixture as elastomer and/or as polymeric foam, the preferred viscosity is usually higher than the preferred viscosity for functional mixtures that are applied to substrate.

The cured functional mixture of the present invention may be useful for a variety of purposes, including, for example, as an adhesive, a sealant, a coating, an elastomer, a film, a foam, or an ingredient thereof. Furthermore, more specifically it is useful as a flexible laminating adhesive, a rigid laminating adhesive, a pressure sensitive adhesive, a structural adhesive, an assembly adhesive, or as a home repair adhesive.

The functional mixture of the present invention is capable of curing at 23° C. in 7 days or less. The fact that curing takes place at 23° C. can be verified by measuring the pot life of the functional mixture (i.e., the time from the formation of the functional mixture until the viscosity of the mixture rises until it is so high that the functional mixture can no longer be molded or applied to a substrate) at 23° C. The viscosity of the freshly mixed functional mixture may be measured by any standard method at 23° C.; one useful viscosity measurement method is the use of a Brookfield viscometer, as discussed herein above.

One useful measure of the pot life is the time (herein called the "viscosity quintupling time") required for the viscosity of the functional mixture to reach a value that is 5 times the viscosity of the freshly mixed functional mixture. A useful alternative measure of the pot life is the time (herein called the "viscosity doubling time") required for the viscosity of the functional mixture to reach a value that is 2 times the viscosity of the freshly mixed functional mixture. It is contemplated that, when two mixtures are compared, the mixture with the longer viscosity quintupling time will also have the longer viscosity doubling time. Another useful alternative measure of the potlife is the time required for the viscosity of the functional mixture to reach a value that is 10 times the viscosity of the freshly mixed functional mixture. Still another useful alternative measure of the potlife is the time required for the viscosity of the functional mixture to reach a value that is 100 times the viscosity of the freshly mixed functional mixture.

Yet another useful measurement is the half life of the cure reaction. In general, it is contemplated that, when two mixtures are compared, the mixture with the longer half life will also have a longer viscosity quintupling time. The half life of the cure reaction is determined as follows. The functional mixture is studied using any known analytical method to measure the concentration of functional groups containing structure (I) (such functional groups are herein called "I-groups") present before the curing reaction begins and to measure, as a function of time (measured from the moment when the functional mixture is formed), the concentration of I-groups that have reacted in the curing reaction. The ratio of the concentration of I-groups that have reacted in the curing reaction to the concentration of I-groups that were present before the curing reaction began is herein called "conversion." The half life of the curing reaction is the time required for conversion to reach 0.50. The half life may be assessed by any of a wide variety of methods.

One method of assessing the half life of the curing reaction is the line-fit method, which is performed as follows. At each time, conversion is measured and is used to calculate the "reaction progress ratio," herein defined as (conversion)/(1−conversion). The values of reaction progress ratio as a function of time are fit to a straight line using a standard linear least-squares method. The half life of the cure reaction is then the reciprocal of the slope of the straight line thus determined. The line-fit method of assessing the half life is suitable when a person of ordinary skill in the art would consider the dependence of reaction progress ratio vs. time to be linear; if a person of ordinary skill in the art would consider the dependence of reaction progress ratio versus time to be nonlinear, then some other method of assessing the half life of the reaction would be used.

In some embodiments, pot life of the functional mixture is 5 minutes or more; or 10 minutes or more; or 25 minutes or more. Independently, in some embodiments, pot life is 7 days or less; or 1 day or less; or 8 hours or less; or 2 hours or less; or 30 minutes or less.

In other embodiments, a shorter pot life of the functional mixture is desirable. In some shorter pot life embodiments, pot life of the functional mixture is 30 seconds or more; or 1 minute or more; or 2 minutes or more. Independently, in some shorter pot life embodiments, pot life is 20 minutes or less; or 10 minutes or less; or 5 minutes or less. For example, some embodiments in which the cured functional mixture will be used as a foam or elastomer will desirably be shorter pot life embodiments.

In the practice of the present invention, it is contemplated that the first pack and the second pack are each independently storage stable. A pack is defined herein as "storage stable" if it does not undergo significant change in physical or chemical properties during storage. In some embodiments, each pack will have viscosity that does not change by a factor of 2 or more when stored at ambient temperature (20° C. to 25° C.) for 7 days, or for 30 days. For a pack that contains one or more catalysts, storage stability also means that the pack retains reactivity on storage; that is, the ability of the pack to participate in Michael addition does not significantly degrade upon storage.

To test the retention of reactivity, a freshly-made pack containing one or more catalysts is admixed with other ingredients to form the functional mixture of the present invention, and the pot life (as defined herein above) is measured; also, the pack containing one or more catalysts is stored in an oven at 60° C. for 7 days, and then it is admixed with the same other ingredients to make the functional mixture, and the pot life is measured. The pack containing one or more catalysts is considered to be storage stable if the ratio of the pot life of the fresh (i.e., made from the freshly-mixed pack containing one or more catalysts) functional mixture to the pot life of the aged (i.e., made from the oven-stored pack containing one or more catalysts) functional mixture is between 0.5 and 2.0. In some embodiments, this ratio is 0.75 or greater; in some embodiments, this ratio is 1.5 or less; or 1.2 or less; or 1.1 or less. In some embodiments, the pot lives of the fresh functional mixture and the aged functional mixture are both appropriately measured by the half-life method, as defined herein above.

In some embodiments of the present invention, the functional mixture contains at least one acid scavenger. An acid scavenger, as defined herein, is a compound that is capable of reacting with an acid, either a carboxylic acid or another acid that functions to neutralize acidic compounds. In some embodiments, a portion of the weakly basic catalysts functions as an acid scavenger while the remaining portion functions as a catalyst. One suitable example is potassium carbonate. In other embodiments, certain acid scavengers cannot catalyze the curing of the functional mixture and require a weakly basic catalyst. One suitable example is carbodiimide. By "reacting with an acid" is meant herein that the acid scavenger is capable of interacting with the acid (for example, by forming a covalent bond, an ionic bond, or a complex) to form a temporary or permanent product; the interaction between the acid scavenger and the acid eliminates or reduces the tendency of the acid to participate in interactions with compounds other than the acid scavenger. Some examples of acid scavengers are tertiary amines (such as, for example, triethanol amine), amidines, guanidines, aziridines (such as, for example, ethyleneimine), carbodiimides, organic titanium compounds, organic zirconates, weak base ion exchange resins, nitrogen containing resins (such as, for example, poly-2-ethyl-2-oxazoline and polyvinylpyrolidone), and mixtures thereof. Some organic titanium compounds known to be effective as acid scavengers are, for example, tetra butyl titanate, tetra isopropyl titanate, and titanium acetylacetate, sold by DuPont Co. as, respectively, Tyzor™ TnBT, Tyzor™ TPT, and Tyzor™ AA.

In some embodiments in which one or more acid scavengers are used, the acid scavenger includes one or more carbodiimide (CDI). Carbodiimides have the chemical structure

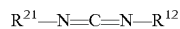

where $R^{21}$ and $R^{12}$ are, independent of each other, hydrocarbon structures or structures that contain, in addition to carbon and hydrogen, and at least one heteroatom (i.e., an atom other than hydrogen or carbon) such as, for example, oxygen, nitrogen, sulfur, or phosphorus. For example, $R^{21}$ and $R^{12}$ may be chosen from alkyl, aryl, alkyl-substituted aryl, aryl-substituted alkyl, and mixtures thereof. In some embodiments, at least one of $R^{21}$ and $R^{12}$ contains at least one ether link, thioether link, ester link, urethane link, amide link or combination thereof. Also contemplated are carbodiimides in which one or both of $R^{21}$ and $R^{12}$ is a polymer.

In some embodiments, the acid scavenger of the present invention includes one or more carbodiimide that has the structure known as a polycarbodiimide (pCDI):

where n is 2 or greater, and where $R^{13}$, $R^{14}$, and $R^{15}$ are each independently chosen from the groups described herein above as suitable for $R^{21}$ and $R^{12}$. The $R^{14}$ groups may be all the same or may be any number (up to n) of different groups. In some embodiments, at least one of $R^{13}$ and $R^{15}$ contains at least one ether link, thioether link, ester link, urethane link, or amide link. In some embodiments, at least one of $R^{13}$ and $R^{15}$ has molecular weigh of 200 or greater. In some embodiments, $R^{14}$ groups are chosen from alkyl, aryl, alkyl-substituted aryl, and combinations thereof. A pCDI in which all of the $R^{14}$ groups are chosen from aryl, alkyl-substituted aryl, and mixtures thereof are known herein as "aromatic pCDIs." In some embodiments, at least one pCDI is used. In some embodiments, at least one pCDI is used in which the $R^{14}$ groups are all the same.

Some embodiments of the present invention involve applying a layer of the functional mixture to a substrate. The layer may be a continuous or discontinuous film. The method of application may be by any of a number of ways known to those having ordinary skill in the art, such as, for example, brushing, spraying, roller coating, rotogravure coating, flexographic coating, flow coating, curtain coating, dipping, hot melt coating, extrusion, co-extrusion, similar methods, and combinations thereof. In some embodiments, application of a layer of functional mixture to substrate is performed at ambient temperature. In other embodiments, the application may be performed at elevated temperature, for example to adjust the viscosity of the functional mixture. When elevated temperatures are used to apply the mixture, cure still is achieved or achievable at 23 C in 7 days or less.

In other embodiments, particularly those in which the cured functional mixture will be used as a foam or as an elastomer, the functional mixture may be formed by mixing the ingredients in a mold or other suitable container and kept therein during the cure reaction. Alternatively, after the ingredients are mixed, the functional mixture may be placed into a mold or other suitable container and kept therein during the cure reaction.

In some embodiments, the functional mixture may be dried. That is, after the first pack and second pack are mixed together but before the functional mixture is put to use, a period of time may elapse, to allow any volatile compounds, such as, for example, solvents, if any volatile compounds are present, to evaporate. During this period of time, in some embodiments, the functional mixture may be exposed to reduced pressure or to a moving atmosphere. Drying may be performed before, during, or after the cure reaction takes place. Independently, in embodiments involving applying the functional mixture to a substrate or placing it into a mold, drying may be performed before, during, or after the functional mixture is applied to substrate or placed into a mold.

In some embodiments, few or no volatile compounds are released during the cure process. For example, in some embodiments, the weight of the functional mixture reduces by 10% or less, based on the initial weight of the functional mixture (i.e., the weight of the freshly-mixed functional mixture), during the cure process. In some embodiments, the weight of the functional mixture reduces by 5% or less, or 2% or less, or 1% or less, based on the initial weight of the functional mixture, during the cure process.

In some embodiments that involve applying a layer of the functional mixture to a substrate, one or more substrates may be treated prior to contact with the functional mixture, using one or more of treatments such as, for example, corona discharge or coating with chemical primer. In other embodiments, the substrate is contacted with the functional mixture of the present invention without prior treatment. The functional mixture may be applied, for example, at a level of 0.2 to 116 g/m² (0.12 to 71.2 lb/ream).

In embodiments in which the functional mixture will be used to bond substrates to each other, after a layer of the functional mixture has been applied to a first substrate, the layer may then be contacted with another substrate to form a composite. The composite so formed is optionally subjected to applied pressure, such as passing it between rollers to effect increased contact of the substrates with the composition; such pressure is often applied before the cure reaction is substantially complete. In another embodiment of the invention, layers of the functional mixture may be simultaneously or sequentially applied to both surfaces of a first substrate, which layers are then simultaneously or sequentially contacted with two further substrates, which may be the same, or different. It is further contemplated that the composite construction may sequentially be bonded to other substrate(s) using the functional mixture of the invention, or a different composition before or after the process described herein. The first and second substrates to be bonded in the method of this invention may be the same or different and include, for example plastics, metallized plastics, metal, paper, wood and particle board, which may have smooth or structured surfaces.

Among embodiments in which the functional mixture will be used to bond substrates to each other, in some of these embodiments, the composite will be heated above 23° C. The functional mixture of the present invention is capable of cure at 23° C. in 7 days or less, but in some embodiments it is desirable to hasten or otherwise improve the cure process by heating the composite to temperature above 23° C. When such heating is performed, the composite may be heated to temperatures above 35° C., or above 50° C., or above 100° C. Also contemplated are embodiments in which the composite is maintained at temperature below 35° C. during the cure process.

Among embodiments in which the functional mixture will be used to bond substrates to each other, in some of these embodiments, most or all of the Michael addition reaction is completed before the functional mixture is in contact with any substrate or while the functional mixture is in contact with only one substrate.

In other embodiments in which the functional mixture will be used to bond substrates to each other, a substantial part the Michael addition reaction takes place when the functional mixture is in contact with at least two substrates. In some of such embodiments, at least 25 mole % of the Michael addition reactions that take place occur when the functional mixture is in contact with at least two substrates; in other such embodiments, at least 50 mole %, or at least 75 mole %, or at least 90 mole % of the Michael addition reactions that take place occur when the functional mixture is in contact with at least two substrates.

In some embodiments of the present invention, the substrates are relatively thin and flat, and the resulting composites are called laminates. Some examples of substrates for laminates are polyalkylenes, such as polyethylenes and polypropylenes, polyvinyl chloride, polyesters such as polyethylene terephthalate, polyamides (nylon), ethyl cellulose, cellulose acetate, metallized polypropylene, paper, aluminum foil, other metals, ceramic sheet materials, etc., which may be provided in the form of rolls, sheets, films, foils etc. Further examples of substrates for laminates are woven or nonwoven fabrics, which may be constructed of fibers using one or more natural or synthetic fibers made of materials such as, for example, cotton, wool, rayon, nylon, polyester, polyalkylene, glass, or ceramics.

An adhesive suitable for bonding substrates together to form a laminate is known herein as a "laminating adhesive."

In the practice of the present invention, substrates that may be bonded to each other by the functional mixture of the present invention to form laminates may be the same as each other or different from each other.

The cured functional mixture may be used for any of a wide variety of purposes. For example, the cured functional mixture may be used as an elastomer, either bonded to a substrate or as an elastomeric article. For another example, the cured functional mixture may be formed and cured under conditions that produce a foam. For a further example, a layer of the functional mixture may be applied to a substrate and then left exposed to air to form a coating; such a coating may be continuous or discontinuous; it may be protective or decorative or both; it may function, for example, as a paint, as another type of coating, or as an ink. The use for cured functional mixture may be, for example, as one or more of a gasket, a sealant, a roofing membrane, or a film.

The cured functional mixture may be characterized by measuring its glass transition temperature (Tg). The glass transition temperature may be measured by Dynamic Mechanical Analysis (DMA) in flexural mode at 1 hertz (1 cycle/sec). The Tg is identified as the peak in the curve of tan delta versus temperature. The DMA test may be performed on the cured functional mixture by itself, or the DMA test may be performed while the cured functional mixture is in contact with other materials. For example, if the cured functional mixture is in a layer between substrates in a composite, the entire composite may be tested in the DMA test; persons skilled in the art will readily know how to ignore any peaks in the curve of tan delta versus temperature that are due to substrates or to materials other than the cured functional mixture. In some embodiments (herein called "multi-Tg" embodiments), the cured functional mixture will have more than one peak in the curve of tan delta versus temperature.

The statement that a cured functional mixture "has a Tg of" a certain value is to be understood herein to mean that the cured functional mixture either has a sole Tg of that certain value or that the cured functional mixture has multiple peaks in the curve of tan delta versus temperature, one of which has a peak of that certain value.

The cured functional mixture of the present invention may have any of a wide range of Tg's. In some embodiments, the cured functional mixture will have a Tg of −80° C. or higher. Independently, in some embodiments, the cured functional mixture will have a Tg of 120° C. or lower. The Tg or multiple Tg's will be chosen to give the best properties that are desired for the intended use of the cured functional mixture.

For example, when the cured functional mixture is intended for use as a structural adhesive, the functional mixture will usually be chosen so that the cured functional mixture will have a Tg of 50° C. or higher. As another example, when the cured functional mixture is intended for use as a pressure-sensitive adhesive, the functional mixture will usually be chosen so that the cured functional mixture will have a Tg of 15° C. or lower; or 0° C. or lower; or −25° C. or lower; or −50° C. or lower. As yet another example, when the cured functional mixture is intended for use as a laminating adhesive, the functional mixture will usually be chosen so that the cured functional mixture will have a Tg of −30° C. or higher; or −15° C. or higher; or −5° C. or higher; or 15° C. or higher; or 30° C. or higher.

It is to be understood that for purposes of the present specification and claims that the range and ratio limits recited herein can be combined. For example, if ranges of 60 to 120 and 80 to 110 are recited for a particular parameter, it is understood that the ranges of 60 to 110 and 80 to 120 are also contemplated. Additionally, if minimum range values of 1 and 2 are recited, and if maximum range values of 3, 4, and 5 are recited, then the following ranges are all contemplated: 1 to 3, 1 to 4, 1 to 5, 2 to 3, 2 to 4, and 2 to 5.

EXAMPLES

Materials and Abbreviations

SR-259=polyethylene glycol (200) diacrylate, from Sartomer Co.
Morcure™ 2000=diacrylate of diglycidyl ether bisphenol-A, from Rohm and Haas Co.
SR-610=polyethylene glycol (600) diacrylate, from Sartomer Co.
NPG Bis AcAc=neopentylglycol bisacetoacetate
TMP Tris AcAc=trimethylol propane trisacetoacetate
PNE Tetra AcAc=pentaerythritol tetraacetoacetate
V-O2-L2=solution of aliphatic polycarbodiimide, equivalent weight 385 g/mol, 40% concentration in water, manufactured by Nisshinbo
XL-1422=aromatic polycarbodiimide; supplied as solution of 50% concentration in solvent; solvent removed before use herein, manufactured by Rohm and Haas Company
GF-10=linear low density polyethylene film, thickness 0.025 mm (1 mil)
GF-19=high slip linear low density polyethylene film, thickness 0.025 mm (1 mil)
48 g PET=corona treated polyethylene terephthalate, thickness 0.012 mm (0.48 mil)
OPP=corona treated oriented polypropylene, thickness 0.044 mm (1.75 mil)
75 LBW=oriented polypropylene, thickness 0.019 mm (0.75 mil)
70 SPW=oriented polypropylene, thickness 0.018 mm (0.70 mil)
Emblem™ 1500=nylon from Honeywell, thickness 0.015 mm (0.60 mil)
48LBT=polyester film, thickness 0.012 mm (48 gauge)
92LBT=polyester film, thickness 0.023 mm (92 gauge)

T-Peel Test Procedure:

In the T-peel test, a layer of functional mixture is applied to a first film. Any solvents or other volatile compounds present in the functional mixture are substantially removed before, during, or after application of the layer. Then, a second film (of the same material as the first film or a different material from the first film) is contacted with the layer of functional mixture, and the laminate so formed is pressed between nip rollers. The functional mixture is cured or allowed to cure.

The laminate is stored under ambient conditions (20-25° C.) for various durations prior to testing.

A strip of laminate of width 25 mm (1 inch) is cut, and the strip is peeled apart in a tensile tester at speed of 4.2 mm/sec (10 in/min). The T-peel result is recorded as the maximum load (in grams of load) required to pull the strip apart. Also recorded is location of the failure during the peel test: "A" if the adhesive failed at the bond between the adhesive and at least one substrate, "S1" if the first film failed, and "S2" if the second film failed. For each duration of storage prior to testing, a T-peel result and a failure mode are reported.

Example 1

Preparation of MFA1 and MFA 2

Each of the following mixtures (MFA1 and MFA2) was prepared by mixing solid potassium acetate with the remaining ingredients:

MFA1=5.6 g Morcure™ 2000, 2.4 g SR-259, 0.1 g potassium acetate
MFA2=7.38 g Morcure™ 2000, 3.16 g SR-610, 0.1 g potassium acetate

Example 2

Functional Mixtures FM1 and FM2

The following functional mixtures were formed by stirring together the ingredients listed:
FM1=8.1 g MFA 1, 5 g TMP Tris AcAc
FM2=10.64 g MFA2, 5 g TMP Tris AcAc

Example 3

Test Results on FM1 and FM2

The T-peel test, as defined above, was performed, with the substrates, coat weight (CW), and results were as follows:

| FM# | Substrate #1 | Substrate #2 | CW g/m² (lb/ream) | 7-day Failure | 7-day T-Peel grams |
|---|---|---|---|---|---|
| 1 | OPP | OPP | 1.5 (0.9) | A | 170 |
| 1 | OPP | GF19 | 1.1 (0.7) | S2 | 600 |
| 1 | GF19 | Emblem 1500 | 1.3 (0.8) | S1 | 435 |
| 1 | 48 g PET | GF19 | 1.1 (0.7) | S2 | 482 |
| 2 | GF19 | 75 LBW | 1.26 (0.77) | S1 | 656 |
| 2 | 70 SPW | 75 LBW | 2.10 (1.29) | S1 | 624 |

Example 4

Pot Life Measurements

First, an acrylate mixture (AM1) was made by mixing SR-259 and Morcure™ 2000 in the ratio of SR-259 to Morcure™ 2000 of 15:85 by weight.

Then, mixtures were formed by adding an amount ("X" grams) of an aqueous solution of potassium acetate (KOAc) to AM1. The concentration of the aqueous solution of potassium acetate was 70% potassium acetate, based on the weight of the aqueous solution. Each mixture was hazy when formed at room temperature. Each mixture contained 14.78 g of AM1.

Then, each mixture was mixed with 9.00 g of neopentylglycol bis(acetoacetate). The initial viscosity and the viscosity as a function of time of each mixture was measured at 25° C. with Brookfield viscometer, #4 spindle, 60 rpm. A plot of the natural log of viscosity versus time was made, and the slope of that line was determined with a linear least-squares fit. The time required for viscosity to double ("doubling time") is the natural log of 2 divided by the slope of that line. The results for pot life test mixtures (PLTM) were as follows:

| PLTM # | KOAc solution grams[1] | initial viscosity Pa*s (cps) | doubling time minutes |
|---|---|---|---|
| 1 | 0.37 | 1.04 (1040) | 32.7 |
| 2 | 0.65 | 1.10 (1100) | 14.0 | note[1]:
the amount "X" defined above.

It is expected that, if the experiment were carried out until the viscosity reached a value that was at least 5 times the initial viscosity, then the data would be fit by the same linear least-squares fit. In such a case, the viscosity quintupling time would be found by multiplying the viscosity doubling time by the ratio of the natural log of 5 to the natural log of 2. Thus the viscosity quintupling time of PLTM1 is expected to be approximately 76 minutes, and the viscosity quintupling time of PLTM2 is expected to be approximately 33 minutes. It is expected that, if these measurements were made at 23° C., the viscosity quintupling times of PLTM1 and PLTM2 would be less than 8 hours.

Example 5

Preparation of Potassium Octoate

The potassium octoate was prepared by stirring 5.76 g of octanoic acid in 2 g of water and neutralizing with 5.00 g of aqueous potassium hydroxide (45%) diluted with 3 g of water. A waxy solid formed in the flask which was dissolved by adding about 15 ml of ethanol. The total solution was evaporated on a watch glass on a steam bath under a flow of nitrogen to give 7.2 g white solid.

Example 6

Preparation of Sodium Octoate

The sodium octoate was prepared by stirring 3.60 g of octanoic acid in 3 g of water and neutralizing with 2.00 g of aqueous sodium hydroxide (50%). 5 g of water was used for dilution and rinse. A waxy solid formed which was dissolved by adding about 10 ml of ethanol. pH paper indicated a pH of about 8. The total solution was evaporated on a watch glass on a steam bath under a flow of nitrogen to give 4.04 g white solid. The solid was titrated in ethanol with aqueous HCl: the titer was 5.88 mmol/g. Estimated purity was 97.6%.

Example 7

Preparation of Tetrabutylammonium Acetate

The tetrabutylammonium acetate was prepared by stirring 0.90 g of acetic acid in 3 g of water and neutralizing with 9.7 g of aqueous tetrabutylammonium hydroxide (40%) and rinsed with 5 g water. The pH was monitored with pH paper and neutralization stopped when most of the base was added and the pH was neutral. The total solution was evaporated on a watch glass on a steam bath under a flow of nitrogen. A clear oil was obtained which crystallized on cooling. The solid was scraped up and further dried for 2 days in a vacuum desiccator over Drierite to give 4.21 g of a hygroscopic, white solid. The solid was titrated in ethanol with aqueous HCl: the titer was 3.14 mmol/g. Estimated purity=94.4%.

Example 8

Solution of Potassium Acetate in MFA

The MFA was a mixture (herein called "MFA8") of 70 wt % Morcure™ 2000 and 30 wt % Sartomer SR-610. The MFA mixture MFA8 (956 g) and 24.5 g of anhydrous potassium acetate were combined in a 2 liter, 4-necked round-bottom flask fitted with a mechanical stirrer, dry-air sparge and thermocouple and heated on a heating mantle. The heat to the mantle was controlled through a controller connected to the thermocouple. While maintaining a slow flow of dry air, the mixture was stirred and heated gradually to 75° C. and held for 1 hr at 75° C. Most of the salt appeared to be dissolved. The mixture was cooled to about 60° C. and a vacuum was applied to the flask to help remove entrapped air bubbles. The mixture was vacuum filtered hot on Whatman GF/A glass microfibre filter to give a clear, viscous resin: viscosity (Brookfield, spindle #4, 3 rpm, 25° C.) 137 Pa*s (137,000 cP). Titration showed potassium acetate concentration was 2.41 wt % based on the total weight of the MFA plus potassium acetate (theory charged=2.50 wt %).

Examples 9-11

Other Solutions of Carboxylate Salts in MFA

The multifunctional acrylate mixture MFA8 of Example 8 and various carboxylate salts were combined in a 100 ml, 3-necked round-bottom flask fitted with a mechanical stirrer and thermocouple and heated on a heating mantle. The heat to the mantle was controlled through a controller connected to the thermocouple. The mixture was stirred and gradually heated to 75° C. and held at 75° C. for the time shown below as "T75." If all of the salt did not appear to be dissolved, the mixture was vacuum filtered hot on a sintered glass funnel to give a clear, viscous resin. The mixture was then titrated to determine the amount of carboxylate salt actually dissolved, shown below as "% diss," the weight percent of salt based on the total weight of the MFA plus carboxylate salt. The results are shown below:

| No. | MFA (g) | Salt type | Salt (g) | T75 (hour) | Filtered? | % diss | Viscosity Pa*s (cP) |
|---|---|---|---|---|---|---|---|
| 9 | 96.0 | potassium acetate | 5.0 | 2 | Yes | 3.57 | 384[2] (384,000) |
| 10 | 99.0 | potassium acetate | 1.25 | 1 | No | 1.25 | 38[3] (38,000) |
| 11 | 95.5 | potassium octoate | 4.55 | 2 | Yes | 4.15 | 155[4] (155,000) | note[2]:
Brookfield, #4 spindle, 0.6 rpm, 25° C.
note[3]:
Brookfield, #4 spindle, 12 rpm, 25° C.
note[4]:
Brookfield, #4 spindle, 3 rpm, 25° C.

Example 12

Preparation of Trimethylolpropane Tris(Acetoacetate)

A 1 liter, 4-neck round-bottom flask fitted with mechanical stirrer, pressure equalizing addition funnel (nitrogen inlet), thermocouple connected to a controller and mantle for heating, a 5-plate Oldershaw column and vacuum type distilling head with finger type condenser and stopcock to control the reflux ratio was charged with 201 g (1.50 mol) trimethylolpropane, 100 g (0.63 mol) tert.-butyl acetoacetate and 282 g of toluene. An additional 626.5 g (3.96 mol) of tert.-butyl acetoacetate was charged to the addition funnel. A slow nitrogen flow was maintained through the addition funnel and reactor and the mixture was heated to about 111° C. Reflux began when the flask contents reached about 111° C. and the reflux ratio/take-off was adjusted to keep the head temperature between 82-84° C. The additional tert.-butyl acetoacetate was gradually added over about 4 hr as 442 ml of distillate was collected. The pot temperature increased gradually to 117° C. during the addition. Distillation continued: the pot temperature gradually increased to 132° C. and the head temperature increased to 109° C. over an additional 2.3 hr. Total distillate collected was 472 g determined to be 70.59% tert.-butanol or 100.1% of theory.

The product was isolated by passing it through a wiped-film evaporator: one pass at 100° C., 100 mm pressure and a second pass at 120° C. and >5 mm pressure (mechanical vacuum pump, full vacuum). Isolated yield was 98%.

Example 13

Michael Reaction Half Lives

The experiments were carried-out in a 1 oz capped vial equilibrated in a 25° C. thermostated water bath. For each reaction, 4.2 g of the catalyst/multifunctional acrylate mixture (from Examples 8-11) were weighed and equilibrated for at least 1 hr. in the water bath. Separately, the trimethylolpropane tris(acetoacetate) was equilibrated at 25° C. At time '0', 2.00 g of trimethylolpropane tris(acetoacetate) was weighed into the reaction vial and well mixed with a metal spatula, capped and replaced into the water bath. The vial was stirred briefly and samples were withdrawn at about 30, 60 and 120 min (20, 40 and 60 min for the higher catalyst concentration) and evaluated by nmr analysis. $^1$H nmr spectra were recorded on a Bruker Avance™ 500 instrument and analyzed and integrated using WIN-NMR software.

The NMR samples of the reaction mixtures were made-up in $CDCl_3$ solvent which contained acetic acid (20 ml acetic acid/20 ml $CDCl_3$) to quench the Michael reaction. There was generally some precipitate formed when the samples were prepared, which was assumed to be the catalyst salt, but this did not appear to interfere with obtaining the spectrum. The multifunctional acrylate containing Morcure™ 2000 shows two absorbencies centered at δ 7.12 and 6.81 ppm assigned to aromatic protons of the Morcure™ structure; these do not change during the Michael reaction and are used as internal standard; the sum of the integrals of these two absorbencies is added together, and the sum is Integral B. The three protons on the acrylate bond appeared as three groupings in the region δ 6.5-5.8 ppm and are integrated together, and the sum is Integral A.

The normalized concentration of acrylate (herein called "[Acrylate]$_N$") is thus: [Acrylate]$_N$=(Integral A)/(Integral B)

As reaction occurs, acrylate is used-up in proportion to the moles of reaction, and conversion can be calculated relative to the normalized acrylate integration at time 0, which is the same as [Acrylate]$_N$ for the multifunctional acrylate mixture itself. The conversion of acrylate as a function of sampling time ("t") is thus simply calculated:

$$AN0 = [\text{Acrylate}]_N \text{ at time} = 0$$

$$ANT = [\text{Acrylate}]_N \text{ at time} = t$$

$$\text{Conversion} = (AN0 - ANT)/AN0$$

The half life was determined as described above, and the results were as follows:

| Example No. | MFA source | Catalyst | Half Life (min) |
|---|---|---|---|
| 13a | Example 8 | potassium acetate | 110 |
| 13b | Example 9 | potassium acetate | 45 |

-continued

| Example No. | MFA source | Catalyst | Half Life (min) |
|---|---|---|---|
| 13c | Example 10 | potassium acetate | 313 |
| 13d | Example 11 | potassium octoate | 91 |

The table shows the dose relationship of reaction rate with catalyst concentration and the approximate equal reactivity of potassium acetate and potassium octoate on a molal level.

Example 14-16

Solutions of Further Salts in MFA Mixture

Using the methods of Example 8, the following salts were dissolved in MFA mixture:

| No. | MFA (g) | Salt type | Salt (g) | T75[10] (hour) | Filtered? | % diss |
|---|---|---|---|---|---|---|
| 14 | 64.9 | sodium acetate | 0.805 | 2 | Yes | 0.22 |
| 15 | 69.8 | sodium octoate | 1.74 | 2 | Yes | 0.53 |
| 16 | 68.6 | tetrabutylammonium acetate | 3.30 | 1 | No | 4.30 | note[10]:
duration of stirring salt and MFA at 75° C.

Example 17-20

Further Michael Reaction Half Lives

Using the methods of Example 13, various MFA/salt mixtures were combined with trimethylolpropane tris(acetoacetate), and the half lives were measured, with the results as follows:

| Example No. | MFA source | Catalyst | Half Life (min) |
|---|---|---|---|
| 17 | Example 8 | potassium acetate | 423 |
| 18 | Example 14 | sodium acetate | 3393 |
| 19 | Example 15 | sodium octoate | 1698 |
| 20 | Example 16 | tetrabutylammonium acetate | 499 |

The table shows comparable reactivity of the tetrabutylammonium acetate catalyst with potassium acetate and smaller, but not zero, reactivity of the sodium acetate and sodium octoate catalysts. It is contemplated that the information in Examples 18, 19, and 20 indicate that, with the correct choice of multifunctional Michael donor and multifunctional Michael acceptor, embodiments of the present invention could be found that use, as the soluble weakly basic catalyst, one or more of sodium acetate, sodium octoate, and tetrabutylammonium acetate.

Example 21

C22, 23, 24, C25, C26 Heat-Age Stability

Using the methods of Example 13, half lives of various mixtures were measured, using the various packs defined below: In some cases, the half life was measured on mixtures made from freshly prepared packs; in other cases, one or more packs was heat aged (i.e., stored in an oven at 60° C. oven for 7 days).

Pack A: 70% by weight Morcure™ 2000 plus 30% by weight Sartomer SR-610

Pack B: solution of potassium acetate in MFA mixture defined in Example 8

Pack C, 0.126 ml of sodium ethoxide solution (21% concentration in ethanol) dissolved in 12.6 g of Pack A Pack D: trimethylolpropane tris(acetoacetate)

Pack E: 0.210 ml of sodium ethoxide solution (21% concentration in ethanol) dissolved in 10.0 g of trimethylolpropane tris(acetoacetate)

| No. | First Pack | First Pack Heat Aged? | Second Pack | Second Pack Heat Aged? | Half Life (min) |
|---|---|---|---|---|---|
| 21 | B | No | D | No | 412 |
| C22[5] | A | No | E | No | 89 |
| 23[6] | B | No | D | No | 402 |
| 24 | B | Yes | D | No | 464 |
| C25[5] | C | Yes | D | No | 4193 |
| C26[5] | A | No | E | Yes | 1291 | note[5]:
comparative examples
note[6]:
repeat of Example No. 21

These data show that the potassium acetate retains much of its catalytic activity after heat age. By contrast, after heat-aging in either the acceptor or donor solution, the sodium ethoxide catalyst has lost much of its activity. It is expected that the functional mixtures defined in Examples 21, 23, and 24 would show viscosity quintupling times of less than 8 hours at 23° C.

Example 27

Laminating Adhesive

The following mixtures were made:
Pack F=7.55 g Morcure™ 2000, 1.33 g SR-259, and 0.25 g potassium acetate
Pack G=2.5 g NPG Bis AcAc and 2.5 g PNE Tetra AcAc Pack F and Pack G were combined to form a functional mixture, which was subjected to a T-peel test as defined herein above, using a first film of 92LBT and second film of aluminum foil of thickness 0.025 mm (1 mil), with a coat weight of 1.8 g/m² (1.1 lb/ream). After one day, T-peel load was 182 g with failure mode of A; after 7 days, T-peel load was 120 g with failure mode of A.

Examples 28-31

Laminating Adhesives with Acid Scavenger

The following mixtures were made:
M28=7.37 g Morcure™ 2000 and 3.16 g SR-610
Pack H1=10.53 g M28, 0.11 g potassium acetate, and 0.8 g V-O2-L2
Pack H2=10.53 g M28, 0.103 g potassium acetate, and 0.34 g XL-1422
Pack J=5 g TMP Tris AcAc
FM28=11.44 g Pack H1 plus 5 g Pack J
FM30=10.98 g Pack H2 plus 5 g Pack J FM28 and FM30 were subjected to T-peel tests as follows:

| Example No. | Adhesive | First Film | Second Film | Coat Weight g/m² (lb/ream) | 18-hour T-Peel grams | 18-hour T-Peel Failure Mode | 24-hour T-Peel grams | 24-hour T-Peel Failure Mode | 48-hour T-Peel grams | 48-hour T-Peel Failure Mode |
|---|---|---|---|---|---|---|---|---|---|---|
| 28 | FM28 | GF10 | 92LBT | 2.4 (1.5) | 494 | A | NT[7] | NT[7] | 494 | S1 |
| 29 | FM28 | 48LBT | GF19 | 2.0 (1.2) | 435 | S2 | NT[7] | NT[7] | 647 | S2 |
| 30 | FM30 | GF10 | 92LBT | 2.2 (1.36) | NT[7] | NT[7] | 447 | A | 565 | A |
| 31 | FM30 | 48LBT | GF19 | 2.1 (1.27) | NT[7] | NT[7] | 235 | S2 | 376 | S2 | note[7]:
not tested

Example 32

A first pack was made as follows: 6.74 grams Morcure™ 2000 were mixed with 2.89 grams SR-259 at 60° C. and then allowed to cool to ambient temperature. To the mixture was added 0.36 grams potassium acetate solution (70% concentration by weight in water, based on the weight of the potassium acetate solution), with stirring; the pack appeared clear. Then 0.85 grams V-02-L2 (40% concentration by weight in water, based on the weight of the V-02-L2 solution) was added to the pack and stirred thoroughly; the pack appeared cloudy.

A second pack contained 6 grams TMP tris AcAc.

The pot life of a mixture of the two packs was measured as follows: 10.84 grams of the first pack was pre-weighed into a 30 ml vial and conditioned at 35° C. for an hour in a water bath. In a separate vial, TMP tris AcAc was conditioned at 35° C. for 1 hour. Six grams of the TMP tris AcAc was then added to the pre-weighed first pack and mixed thoroughly. Viscosity measurements were taken while the mixture was in the water bath (35 C) with a Brookfield Viscometer using a LV 25 spindle. The initial viscosity was 436 mPa*s (436 cps), and the viscosity doubled in 34 minutes. Thus, pot life at 35° C. was 34 minutes.

It is contemplated that, if the pot life had been measured at 23° C., the pot life would have been less than 8 hours.

A mixture of the two packs was tested by the T-Peel test. The mixture was coated onto the first substrate at 35° C. Results were as follows:

| Substrates #1/#2 | Coat Weight g/m² (lb/ream) | 24 Hour t-peel (Grams) | 24 Hour T-peel Failure Mode |
|---|---|---|---|
| GF19/92LBT | 3.1 (1.9) | 529 | S1 |

Example 33

Pot Life Measurement at 23° C.

Mixture MFA33 was made by mixing 70 parts by weight Morcure™ 2000 with 30 parts by weight SR-259. Then FM33 was made by mixing 6 grams TMA tris AcAc, 9.63 grams MFA33, and 0.34 grams of an aqueous solution of potassium acetate. The solution of potassium acetate had concentration of 70% potassium acetate by weight based on the weight of the potassium acetate solution. As a function of time, the viscosity of FM33 was measured with Brookfield viscometer with LV25 spindle at 23° C. The rotation rate (rpm) was chosen for each reading as appropriate (as discussed herein above). The results were as follows.

| T[8] | Visc[9] |
|---|---|
| 0 | 1814 |
| 1 | 1718 |
| 2 | 1680 |
| 3 | 1584 |
| 4 | 1555 |
| 5 | 1622 |
| 6 | 1699 |
| 7 | 1843 |
| 8 | 2035 |
| 9 | 2352 |
| 10 | 2745 |
| 11 | 3283 |
| 12 | 4032 |
| 13 | 5040 |
| 14 | 6345 |
| 15 | 8016 |
| 16 | 10390 |
| 17 | 13390 |
| 18 | 17320 |
| 19 | 21880 |
| 20 | 27970 |
| 21 | 35670 |
| 22 | 44690 |
| 23 | 54470 |
| 24 | 64320 |
| 25 | 75450 |
| 26 | 103800 |
| 27 | 103400 |
| 28 | 116700 |
| 29 | 138880 |
| 30 | 116100 |
| 31 | 172000 |
| 32 | 183800 | note[8]:
time (minutes)
note[9]:
viscosity in milliPascal*seconds (mPa*s), same values as cps.

The viscosity doubling time was between 11 and 12 minutes. The viscosity quintupling time was between 15 and 16 minutes. The viscosity reached 10 times the original value between 18 and 19 minutes, and it reached 100 times the original value between 31 and 32 minutes.

We claim:

1. A functional composition comprising:
   (i) a first pack comprising at least one multi-functional Michael acceptor;
   (ii) a second pack comprising at least one multi-functional Michael donor;
   (iii) optionally, one or more non-functional ingredients;
   wherein at least one of said first pack and said second pack further comprises, at least one weakly basic catalyst wherein the pKa of the conjugate acid of said weakly basic catalyst is greater than or equal to 3 and less than or equal to 9;

wherein said first pack and said second pack are each storage-stable; and wherein a functional mixture formed by admixing ingredients comprising said first pack, said second pack, and is capable of curing at 23° C. in 7 days or less.

2. The functional composition of claim 1, wherein said weakly basic catalyst comprises at least one weakly basic non-amine, non-phosphine catalyst.

3. The functional composition of claim 1 wherein the at least one weakly basic catalyst has a corresponding conjugate acid with a pKa of 7.5 or less.

4. The functional composition of claim 1 wherein said at least one weakly basic catalyst is selected from the group consisting of sodium salts of carboxylic acids, magnesium salts of carboxylic acids, aluminum salts of carboxylic acids, chromium salts of alkyl carboxylic acids that have 6 or fewer carbon atoms, chromium salts of aromatic carboxylic acids, potassium salts of alkyl mono-carboxylic acids that have 6 or fewer carbon atoms, potassium salts of multi-carboxylic acids and mixtures thereof.

5. The functional composition of claim 1 wherein said functional mixture contains at least 70% solids.

6. The functional composition of claim 1, wherein at least one of said first pack and said second pack further comprises at least one acid scavenger.

7. An article formed by a process comprising forming the functional composition of claim 1 and curing said functional mixture, wherein said article is an adhesive, an elastomer, a foam, a film, a gasket, a roofing membrane or a combination thereof.

8. The functional composition of claim 6, wherein said acid scavenger comprises one or more carbodiimide.

9. The functional composition of claim 8, wherein said carbodiimide comprises one or more polycarbodiimide.

10. The functional composition of claim 1 wherein the at least one weakly basic catalyst having has a corresponding conjugate acid with a pKa 5.5 or less.

11. The functional composition of claim 1 wherein the at least one weakly basic catalyst having has a corresponding conjugate acid with a pKa 4.9 or less.

12. The functional composition of claim 1, wherein the weight of the functional mixture reduces by 10% or less during the cure process, based on the weight of the freshly-mixed functional mixture.

* * * * *